US006967694B1

(12) United States Patent
Ninomiya et al.

(10) Patent No.: US 6,967,694 B1
(45) Date of Patent: Nov. 22, 2005

(54) DEMODULATOR FOR DEMODULATING DIGITAL BROADCAST SIGNALS

(75) Inventors: Kunio Ninomiya, Ehime (JP); Seiji Sakashita, Osaka (JP); Hisaya Kato, Kyoto (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/554,219

(22) PCT Filed: Sep. 29, 1999

(86) PCT No.: PCT/JP99/05339

§ 371 (c)(1),
(2), (4) Date: Aug. 14, 2000

(87) PCT Pub. No.: WO00/19645

PCT Pub. Date: Apr. 6, 2000

(30) Foreign Application Priority Data

Sep. 30, 1998 (JP) ................................ 10-277183

(51) Int. Cl.[7] .......................... H04N 5/455; H04L 7/00
(52) U.S. Cl. ...................................... 348/726; 375/355
(58) Field of Search ............................ 348/726, 423.1, 348/425.2, 425.4, 500, 512, 513, 495, 475, 348/638, 464, 467; 375/240.26, 355, 357, 375/368, 365, 366, 367, 371; 370/514, 503, 370/510, 371, 373

(56) References Cited

U.S. PATENT DOCUMENTS 3,626,090 A * 12/1971 Aklyama .................... 348/726
4,091,410 A * 5/1978 Citta .......................... 348/726
4,146,843 A * 3/1979 Isobe ......................... 329/360
4,375,693 A * 3/1983 Kuhn ......................... 375/120
4,596,981 A * 6/1986 Ueno et al. ............. 340/825.2
4,680,647 A * 7/1987 Moriyama .................. 386/112
4,835,770 A * 5/1989 Hayano ....................... 370/94
4,847,840 A * 7/1989 Jinguji ........................ 371/37
5,113,415 A * 5/1992 Muto ......................... 375/325
5,136,292 A 8/1992 Ishida
5,159,327 A * 10/1992 Yi ............................. 345/213
5,287,359 A * 2/1994 Engelse ...................... 370/503
5,321,727 A * 6/1994 Bonnet et al. .............. 375/100
5,400,369 A * 3/1995 Ikemura ..................... 375/116
5,477,199 A 12/1995 Montreuil
5,486,864 A * 1/1996 Zdepski ...................... 348/423
5,497,205 A * 3/1996 Yang et al. ................. 348/737
5,502,748 A * 3/1996 Wilkinson .................. 375/354
5,508,748 A * 4/1996 Krishnamurthy et al. ... 348/475
5,508,752 A * 4/1996 Kim et al. .................. 348/608
5,602,595 A * 2/1997 Citta et al. .................. 348/495
5,621,483 A * 4/1997 Krishnamurthy et al. ... 348/726
5,627,604 A * 5/1997 Krishnamurthy et al. ... 348/726
5,638,140 A * 6/1997 Krishnamurthy et al. ... 348/735
5,673,293 A 9/1997 Scarpa (Continued)

FOREIGN PATENT DOCUMENTS

DE 25 41 187 3/1976

(Continued)

*Primary Examiner*—Paulos M. Natnael
(74) *Attorney, Agent, or Firm*—McDermott Will & Emery LLP

(57) ABSTRACT

To present a digital broadcast demodulator, in a demodulator of digital terrestrial wave broadcast for transmitting coded digital video and audio information in a packet form, capable of detecting packet synchronism stably and precisely, controlling the AGC, and processing the clock regeneration, in spite of inferior environments for receiving broadcast, such as deterioration of C/N of signal due to weak electric field, or strong ghost or multipath characteristic of terrestrial waves.

6 Claims, 10 Drawing Sheets

U.S. PATENT DOCUMENTS 5,847,779 A * 12/1998 Acampora et al. ..... 375/240.26
5,914,988 A * 6/1999 Hu et al. .................... 375/341
5,969,751 A * 10/1999 Lee ............................. 348/21
6,064,443 A * 5/2000 Lee ............................ 348/530
6,144,413 A * 11/2000 Zatsman ..................... 348/525
6,160,543 A * 12/2000 Chen .......................... 345/213
6,192,091 B1 * 2/2001 Yamada ...................... 375/355
6,275,554 B1 * 8/2001 Bouillet et al. ............. 375/371
6,385,257 B1 * 5/2002 Tobita et al. ............... 375/334
6,510,013 B1 * 1/2003 Oshio .......................... 360/32
6,515,976 B1 * 2/2003 Dent et al. .................. 370/336

FOREIGN PATENT DOCUMENTS

EP 0 769 364 4/1997
EP 0 769 873 4/1997
WO 94/11968 5/1994
WO 96/02990 2/1996
WO WO 96/31936 10/1996

* cited by examiner

DEMODULATOR FOR DEMODULATING DIGITAL BROADCAST SIGNALS

DETAILED DESCRIPTION OF THE INVENTION

1. Technical Field of the Invention

The present invention relates to a digital broadcast demodulator for demodulating a digital modulated signal modulated, for example, by multi-value VSB modulation, in digital broadcast for digital transmission by coding video and audio information.

2. Prior Art

Recently, owing to the advancement in the digital compression technology and digital modulation and demodulation technology, the television broadcast is presented by using satellites and CATV. The video data is coded by MPEG2, and the digital modulation system is realized by the QPSK method in satellite broadcast or QAM method in CATV. In the United States, the terrestrial digital broadcast (DTV) is scheduled from the fall of 1998, and the digital modulation 8VSB system by video compression by MPEG2 is planned.

Referring to the drawing, a conventional example of receiving and demodulating apparatus of digital terrestrial broadcast is explained below.

FIG. 10 is a block diagram of a demodulator of terrestrial digital broadcast. Reference numeral 1 is an antenna for receiving an RF signal, 2 is a tuner for selecting a channel, 3 is a SAW filter for limiting the band, 4 is an amplifier for amplifying a signal, 5 and 6 are mixers, 7 is a phase shifter for delaying the phase by 90°, 8 is a voltage controlled oscillator (VCO), 9 and 10 are low pass filters, 11 is an AGC detector for determining the average of signal amplitude, 12 is an A/D converter for converting an analog signal into a digital signal, 13 is a band pass filter, 14 is a square circuit, 15 is a band pass filter, 16 is a phase detector for detecting a phase error, 17 is a loop filter, 18 is a voltage controlled oscillator, 19 is a symbol judging circuit for judging the value of symbol data, 20 is a data value of a known synchronous signal, 21 is a synchronous signal detecting circuit for detecting the synchronous signal in the reception data, and 22 is a waveform equalizer.

In thus constituted demodulator, the operation is explained below. An RF modulated wave signal received by the antenna 1 is put into the tuner 2, and an arbitrary channel is selected. In the tuner 2, the selected signal is controlled of gain and is issued as an intermediate frequency (IF). The IF output from the tuner 2 is limited in band in the frequency characteristic determined in the SAW filter 3, and is put into the amplifier 4.

In the amplifier 4, by a control signal from an AGC detector explained later, the signal level is controlled, and is supplied into mixers 5, 6. The IF signal supplied in the mixers 5, 6 is multiplied by the local frequency signal from the voltage controlled oscillator 8 (VCO) to undergo quadrature detection. After quadrature detection, base band signals of I, Q signals are supplied into the LPF 9 and LPF 10, individually.

Herein, the mixer 6 delivers a beat signal generated by the difference between the carrier frequency and the frequency signal from the VCO, and it is put into the LPF 9, and is supplied into the VCO 8 as frequency error signal. A reproduction carrier from the VCO 8 is put into the mixer 5, and a carrier delayed in phase by 90° is supplied into the mixer 6 through the 90-degree phase shifter 7. By constituting a PLL by the system of the mixer 6, LPF 9, VCO 8 and 90-degree phase shifter 7, the local signal equal to the carrier frequency of the reception modulated wave can be oscillated by the VCO 8.

The base band signal supplied into the LPF 10 is limited to a desired frequency characteristic, and is supplied into the A/D converter 12 and the AGC detector 11. In the AGC detector 11, detecting the envelope of the entered base band signal, an AGC control signal is generated. As the AGC control signal is fed back to the amplifier 4 and tuner 2 and controlled, the AGC operation is carried out.

On the other hand, the base band signal supplied into the A/D converter 12 is converted into a digital signal, and is supplied into a demodulation processing unit and the waveform equalizer in a later stage. The digital data delivered from the A/D converter 12 is put into the BPF 13, and a frequency component Fs/2 of the symbol frequency (Fs) of data speed is extracted.

Being supplied into the square circuit 14, the frequency component of Fs/2 is squared, and is put into the BPF 15. In the BPF 15, a frequency component Fs equal to the symbol speed is extracted, and put into the phase comparator 16. In the phase comparator 16, a phase error from the symbol frequency is detected, and supplied into the loop filter 17.

In the loop filter 17, the phase error signal is integrated, and supplied as control signal of VCO 18. By constituting the feedback loop to the BPF (FS/2) 13, square circuit 14, BPF (FS) 15, phase comparator 16, loop filter 17, and VCO 18, the clock is regenerated.

Further, the digital data is supplied into the symbol judging circuit 19, and the value of the received symbol data is judged, and supplied into the synchronous signal detecting circuit 21. In the synchronous signal detecting circuit, comparing with the symbol data value of the synchronous reference signal from the known data circuit 20 of synchronous signal, the synchronous signal of packet data is detected.

Thus, in order to demodulate the digital terrestrial broadcast 8VSB or the like, important steps are synchronous signal detection processing of transmission packet data, AGC processing for controlling signal amplitude, and clock regeneration for extracting and regenerating clock component from transmission data.

[Problems that the Invention is to Solve]

However, in the event of occurrence of inferior environments for receiving broadcast, such as characteristic ghost and multipath of digital terrestrial broadcast, and same channel interference by NTSC or other analog broadcast, it is extremely difficult to detect the synchronism, operate the AGC or regenerated the clock precisely in such synchronous detection processing by precisely judging the data value of the symbol, AGC processing by determining the average of detected base band signals, or clock regeneration processing of extracting the frequency components in the transmission data. Accordingly, in order to raise the precision, it was required to process by heightening the sampling frequency, or compose the filter by a considerably large circuit.

[Means of Solving the Problems]

To solve the above problems, the digital broadcast demodulator of the invention is characterized by comprising means for detecting and establishing the synchronous signal in reception data by processing only the code bit (MSB) of the reception data, means for operating and processing the data only for the period of synchronous signal, means for regenerating a clock by detecting the phase error from the differential value, and means for performing AGC by comparing the data value of the detected synchronous signal and the reference of the known synchronous signal.

EMBODIMENTS OF THE INVENTION

Referring now to the drawings, preferred embodiments of the invention are described below. First in FIG. 1, the digital broadcast demodulator of the invention is described, particularly about the schematic constitution of the digital broadcast demodulator of digital terrestrial broadcast VSB modulation system, and then the embodiments corresponding to the claims of the invention are specifically described.

Reference numeral 1 is an antenna for receiving an RF signal, 2 is a tuner for selecting a channel, 3 is a SAW filter for limiting the band, 4 is an amplifier for amplifying a signal, 5 and 6 are mixers, 7 is a phase shifter for delaying the phase by 90°, 8 is a voltage controlled oscillator VCO, 9 and 10 are low pass filters, 11 is an AGC detector for determining the average of signal amplitude, 12 is an A/D converter for converting an analog signal into a digital signal, and 22 is a waveform equalizer.

Output digital data of the A/D converter 12 is put into a synchronous (sync) code pattern detecting circuit 101, and synchronous pattern is detected by processing the code bit. The output of the synchronous code pattern detecting circuit 101 is supplied into a detection protection counter circuit 103, a segment synchronism detection establishing circuit 104.

The output of the segment synchronism detection establishing circuit 104 is supplied into a symbol number counter 102, and the counting result of the number of symbols in one packet is fed back into a detection protection counter 103 and a segment sync detection establishing circuit 104. On the basis of the fed-back information, a segment start signal 109 showing the position of segment synchronous signal in the packet, and a segment establishment signal 110 showing the detection establishment of the segment synchronous signal are issued.

The segment synchronism establishment signal 110 is put into a switch circuit 111 to become a switch signal for changing over a control signal from an AGC error detecting circuit 106 mentioned below and a control signal from the AGC detector circuit 11.

The digital data of the A/D converter output is supplied into the clock phase error detecting circuit 105, and is fed together with the signal from the sync pattern detecting circuit 101 and the segment start signal, and a clock phase error of data is issued as clock regeneration control signal to a terminal 108. This clock regeneration control signal is put into a D/A converter 112, and is converted into an analog signal, which is fed into the LPF 113. The control signal integrated in the LPF 113 is put into the VCO 18 to control its oscillation frequency. A feedback loop is composed in the flow of the VCO 18, A/D converter 12, clock phase error detecting circuit 105, D/A converter 112, and LPF 113.

Further, the digital data of the A/D converter output is put also into the AGC error detecting circuit 106, and issued into the terminal 107 as an AGC control signal. The AGC control signal is put into the D/A converter 114, and is converted into an analog signal, and is supplied into the LPF 113. The AGC control signal integrated in the LPF 113 is supplied into the switch circuit 111.

The AGC control signal supplied into the switch circuit 111 is changed over, by the segment establishment signal, between the control signal from the analog AGC detector 11 and the AGC control signal detected by digital processing. The AGC control signal as output from the switch circuit 111 is put into the amplifier 4 and tuner 2, and the amplitude of the input signal is controlled.

In thus constituted digital broadcast demodulator, specific embodiments corresponding to the claims are described below.

Embodiment 1

FIG. 2 shows a block diagram of embodiment 1 corresponding to claims 1, 2, 3 of the invention. This embodiment relates to a digital broadcast demodulator used in an apparatus for receiving digital broadcast by transmitting coded digital video and audio information in packet form, in which, particularly in digital VSB transmission system, the circuit is constituted to process the code bit (MSB) of reception transport packet data, and the synchronous signal in the reception data is established. In this constitution, even in an inferior radio wave condition for receiving broadcast, such as ghost, multipath, or same channel interference of NTSC, the synchronous signal in the packet can be detected and established precisely and securely.

Referring now to FIG. 2, the operation is described below. In the demodulator of the invention, the base band signal after quadrature detection is put into the A/D converter 12, and the clock regeneration has been already locked. Of the output digital data from the A/D converter 12, the code bit (MSB) is supplied into the sync pattern detecting circuit 101. Herein, the data structure of packet of VSB digital terrestrial broadcast is shown in FIG. 5 and FIG. 6. The transmission frame shown in FIG. 5 is composed of 832 symbols in one packet, and the segment sync signal is inserted by the portion of four symbols only from the beginning.

In every 313 packets (segments), field sync signals #1, #2 are inserted. FIG. 6 shows the field sync signal. At the beginning of the packet, a segment sync signal of four symbols, and a specific number of PN codes are composed. The segment sync signal is a mapping signal in the values of +5, −5, −5, +5 as shown in FIG. 6. This signal value is the known data, and is inserted at the beginning of all packets as shown in FIG. 5.

In the sync pattern detecting circuit 101, the code bit (MSB) of all reception data is processed, and +, −, −, +as code pattern of segment sync signal are detected. When processing the signal by the complement of 2, the codes of the segment synchronous signal are −, +, +, −.

When processing the code bits only, even in the presence of strong ghost, multipath interference or NTSC same channel interference characteristic of digital terrestrial broadcast, the reception data receives considerably effects of impedance, and deterioration occurs, but the code bit information is extremely strong against effects of interference even in the inferior reception wave situation, so that the synchronous pattern of the segment sync signal can be detected stably.

When detecting the sync pattern for four symbols in all reception data in the sync pattern detecting circuit 101, simultaneously, signal sdet is issued to the detection protection counter 103 and segment sync detection establishing circuit 104. When counting 832 symbols in one packet, a signal Co is issued to the detection protection counter 103 and segment sync detection establishing circuit 104.

In the segment sync detection establishing circuit 104, sync pattern detection signal sdet, symbol number count-up signal Co, and signal Shld from detection protection counter 103 are supplied, if there is same pattern as the segment sync code pattern in all reception data, it is judged which pattern is the true segment sync signal.

In the operation, an output signal Lo is issued until the signal Co to be issued when reaching the symbol number count 832 of the packet, and the segment synchronous code pattern detection signal sdet are entered simultaneously.

Usually, in the reception data, there are many code pattern data same as the segment synchronous code pattern, but the symbol number counter 102 counts up to 832 which is the number of symbols in one packet when the same code pattern detection signal sdet as the segment sync is entered, but when a sync code pattern is detected on the way, the signal Lo is issued from the segment sync detection establishing circuit 104, and the symbol number counter 102 is reset. Thus, the counting operation is repeated until the signal sdet is entered simultaneously with the output of signal Co of count-up of symbol number 832 of one packet. That is, in the case of a true segment sync signal, when counting of 832 is over, simultaneously, there is a segment sync signal of next packet, and the signal sdet and signal Co are simultaneously entered.

The output signal Co of the symbol number counter 102 and the output signal sdet of the sync pattern detecting circuit 101 are also supplied into the detection protection counter 103. The detection protection counter 103 counts the number of times of simultaneous input of signal sdet and signal Co, and detects and establishes as the true segment sync signal in the reception data while Sdet and Co are entered simultaneously for a predetermined number of times. When detecting and establishing the segment sync signal in the reception data, the segment established signal Shld is issued.

Once the segment is established, if signal sdet and signal Co are not entered simultaneously, the segment establishment is not canceled immediately, but when making mistakes by a specified number of times or more, the establishment of segment sync detection is canceled.

Thus, the constitution of this embodiment comprises the circuit 101 for detecting the known synchronous signal code pattern by processing only the code bit (MSB) of the reception data, symbol number counter 102 for counting the number of symbols in one packet, segment sync detection establishing circuit 104, and detection protection counter circuit 103, and therefore even in an inferior radio wave condition for receiving broadcast such as strong ghost or multipath characteristic of digital broadcast, same channel interference of NTSC broadcast, low C/N, and others, the synchronous signal can be detected and established stably, and decoding can be processed stably.

Embodiment 2

FIG. 3 shows a block diagram of embodiment 2 corresponding to claims 4, 5, 6 of the invention. This embodiment relates to a digital broadcast demodulator used in an apparatus for receiving digital broadcast by transmitting coded digital video and audio information in packet form, in which, particularly in digital VSB transmission system, the clock phase error of reception data is obtained by calculating the difference of N-th and N+1-th (N>1) packet synchronous signals of reception data, and the clock is regenerated stably even in an inferior radio wave reception circumstance.

Referring now to FIG. 3, the operation is described below. The broken line block 116 corresponds to the segment sync detection establishing circuit block of embodiment 1, and it issues the segment sync establishing signal in the reception data and segment start signal showing the position of the segment sync signal in the packet. The operation of block 116 is same as explained in embodiment 1, and is omitted.

The reception digital data issued from an A/D converter 12 is put into a clock phase error detecting circuit 201. The segment sync detection establishing circuit block 116 also feeds the signal sdet showing the position of the same data as the code pattern of the sync signal in the packet data and the signal Segst showing the position of segment signal in the packet data.

FIG. 9 shows a block diagram of clock phase error detecting circuit 201. The digital data from the A/D converter 12 is put into a subtracting circuit 202 through a latch 203, and is further put into the subtracting circuit 202 through a latch 204. In the subtracting circuit 202, the N-th input and the N+1-th input are subtracted, and the subtraction value is put into a latch circuit 207. In the latch circuit 207, the data is latched by the signal sdet of code pattern detection of segment synchronous signal, and issued into a latch circuit 208. The signal sdet is adjusted in time so as to latch the subtraction value at the timing after subtraction operation of the second and third segment sync signals of reception data by the latch circuit 205. In the latch circuit 208, by latching by the signal Segst showing the position of the segment sync signal to be sent out after detecting and establishing the segment sync signal, it is sent out as clock phase error signal Pherr. The signal Segst is also adjusted in time to the timing to be latched by the latch circuit 208, by the subtracted values of the second and third segment sync signals in the latch circuit 206.

FIG. 7 shows sample points of segment sync signal unit. The sample points are a, b, c, d when the oscillation frequency of the VCO is completely matched in phase with the clock of the reception data. The data values are smooth values because the band is limited by filtering processing in the preceding stage. Herein, supposing the N-th data to be the second data value b, by subtraction from the N+1-th data value c, b−c is processed.

As shown in FIG. 7, the subtraction processing is to determine the inclination of sample point values b and c. Herein, when the clock of the reception data and the phase of the frequency signal oscillated by the VCO 18 are synchronized completely, the value of b−c is 0. If the frequency or phase is deviated, as indicated by broken line in FIG. 7, it is like b'−c', and the clock phase error signal Pherr is determined by subtraction process. Feedback control is executed so that this clock phase error signal Pherr may be close to 0. As shown in FIG. 1, the clock phase error is fed into the D/A 112 to be converted into an analog signal, and is supplied into the LPF 113. The clock phase error converted into analog signal is integrated in the LPF 113, and is supplied into the VCO 18 as clock phase control signal. In the VCO 18, the oscillation frequency signal is controlled on the basis of the clock phase control signal, and it is synchronized with the clock signal of the reception data by the PLL.

Incidentally, according the invention as set forth in claim 7, when turning on the power or changing over the channels, until the segment sync signal of the packet is detected and established, it is intended to finish the clock regeneration quickly by feeding back the differential value of all data that should be originally of the same level matched between the sync signal and code pattern in the packet data, continuously to the VCO 18 as clock phase error.

In this embodiment, from the signal Segst showing the position of the synchronous signal of the data being sent out in packet form and the signal sdet showing the sync signal in the packet data and the code pattern are the same data, the N-th and N+1-th sync signals of the packet data are processed by subtraction, and the clock phase error signal Pherr is determined, and the clock regeneration process is executed.

In this method, even in an inferior radio wave condition for receiving digital broadcast, the clock regeneration is realized stably in a very simple and inexpensive circuit constitution.

Embodiment 3

FIG. 4 shows a block diagram of embodiment 3 corresponding to claims 8, 9 of the invention. This embodiment presents an apparatus, that is, a digital broadcast demodulator for receiving digital broadcast by transmitting coded digital video and audio information in packet form, in which, particularly in digital VSB transmission system, the synchronous signal is detected in the received packet data, and from the synchronism detection establishment signal and the signal showing the position of the synchronous signal in the packet, the difference between the data value of synchronous signal and the reference value is calculated, and thereby AGC is realized.

Referring now to FIG. 4, the operation is described below. The broken line block 116 corresponds to the segment sync detection establishing circuit block shown in embodiment 1, and it issues the segment sync establishing signal Shld showing establishment of detection of segment sync signal in the reception data and segment start signal showing the position of the segment synchronous signal in the packet. The operation of block 116 is same as explained in embodiment 1, and is omitted. The digital data output from an A/D converter 12 is put into an AGC error detecting circuit 301.

Also, from the segment sync detection establishing block 116, the signal Shld showing detection and establishment of the segment sync signal in the packet data and the signal Segst showing the position of sync signal are also entered.

FIG. 8 shows segment sync signals added to the beginning of packet data. The segment sync signal is mapped in the values of ±5 as shown in FIG. 8. Since these are known values, at the reception side, the data values corresponding to ±5 may be possessed as reference values. From the signal Segst showing the position of the segment sync signal in the packet, the data values of four symbols from the beginning of the segment sync are subtracted from the reference value. As shown in FIG. 8, when the reception data is entered as indicated by broken line, the difference from the reference value is as indicated by d at the +side, and d' at the −side. Feedback control is executed so that the differences d, d' from the reference value may be closer to 0.

This is to show a case in which reception data larger than the reference value of segment synchronous signal is entered, but when data smaller than the reference value is entered, by subtracting after absolute value processing so that the code may not be inverted by subtraction process to increase the differential value, the AGC error signal Gerr is issued as AGC control signal. The AGC control signal is put into the D/A converter 114 as shown in FIG. 1, and is supplied into the LPF 115. The AGC control signal integrated by the LPF 115 is fed into the amplifier 4 and tuner 2 through the switch circuit 111, and by feedback control, the amplitude of the reception data is controlled to realize AGC.

According to claim 10 of the invention, when turning on the power or changing over the channels, until the segment sync signal in the packet data is detected and established, it is intended to change over the AGC control signal between the control signal of detecting the amplitude error from the envelope of the analog signal and the control signal of detecting the amplitude error from the sync level by digital processing, by supplying the segment establishing signal Shld issued from the terminal 110 shown in FIG. 1 into the SW circuit 111. When the reception data is entered, until the segment sync signal of the packet is detected and established, the AGC control in the analog processing unit in the preceding stage is applied by priority, and after detecting and establishing the segment sync signal in the packet, the error signal from digital processing for detecting the amplitude error from the synchronous signal is fed back, and the AGC is done efficiently.

In this embodiment 3, from the signal Segst showing the position of synchronous signal of data sent in packet form, and the signal Shld showing the detection and establishment of the sync signal, by subtraction processing of the segment synchronous signal of reception data and reference value of segment signal, the amplitude error signal Gerr is determined, and D/A converted, and integrated by LPF, and put into the analog amplifier and tuner through the SW circuit 111, there by controlling the amplitude and realizing AGC. In this method, even in an inferior radio wave condition for receiving digital broadcast, such as ghost and multipath, the AGC is realized stably in a very inexpensive circuit constitution, and the AGC control is realized stably.

[Effects of the Invention]

As described herein, the invention, relating to digital terrestrial broadcast of packet data or the like, comprises sync pattern detecting means for processing code bits of reception data, symbol number counter means, sync detection protection counter means, and sync detection establishing means, in which the true synchronous signal pattern is established and detected, and therefore even in an inferior radio wave condition, such as strong ghost and multipath interference characteristic of digital terrestrial broadcast, the synchronous signal in the packet can be established and detected stably in a very inexpensive circuit constitution.

Also comprising subtracting means of reception data, by determining the inclination between synchronous signals, from the same code pattern detection signal as the sync signal and the signal showing the position of sync signal in the packet, the clock phase error of reception data is detected, and fed back to the VCO for controlling, and therefore even in an inferior radio wave condition, such as strong ghost and multipath interference characteristic of digital terrestrial broadcast, low C/N, and others, the clock can be regenerated stably and precisely in a very inexpensive circuit constitution.

Further, by subtracting the synchronous signal of reception data and known reference value from the signal showing the position of synchronous signal in the reception packet data and the signal detecting and establishing the synchronous signal in the packet data, the amplitude error is determined, and fed back to the analog amplifier circuit and tuner for controlling, so that precise AGC is realized even in an inferior radio wave environment.

REFERENCE NUMERALS

Figure 1:
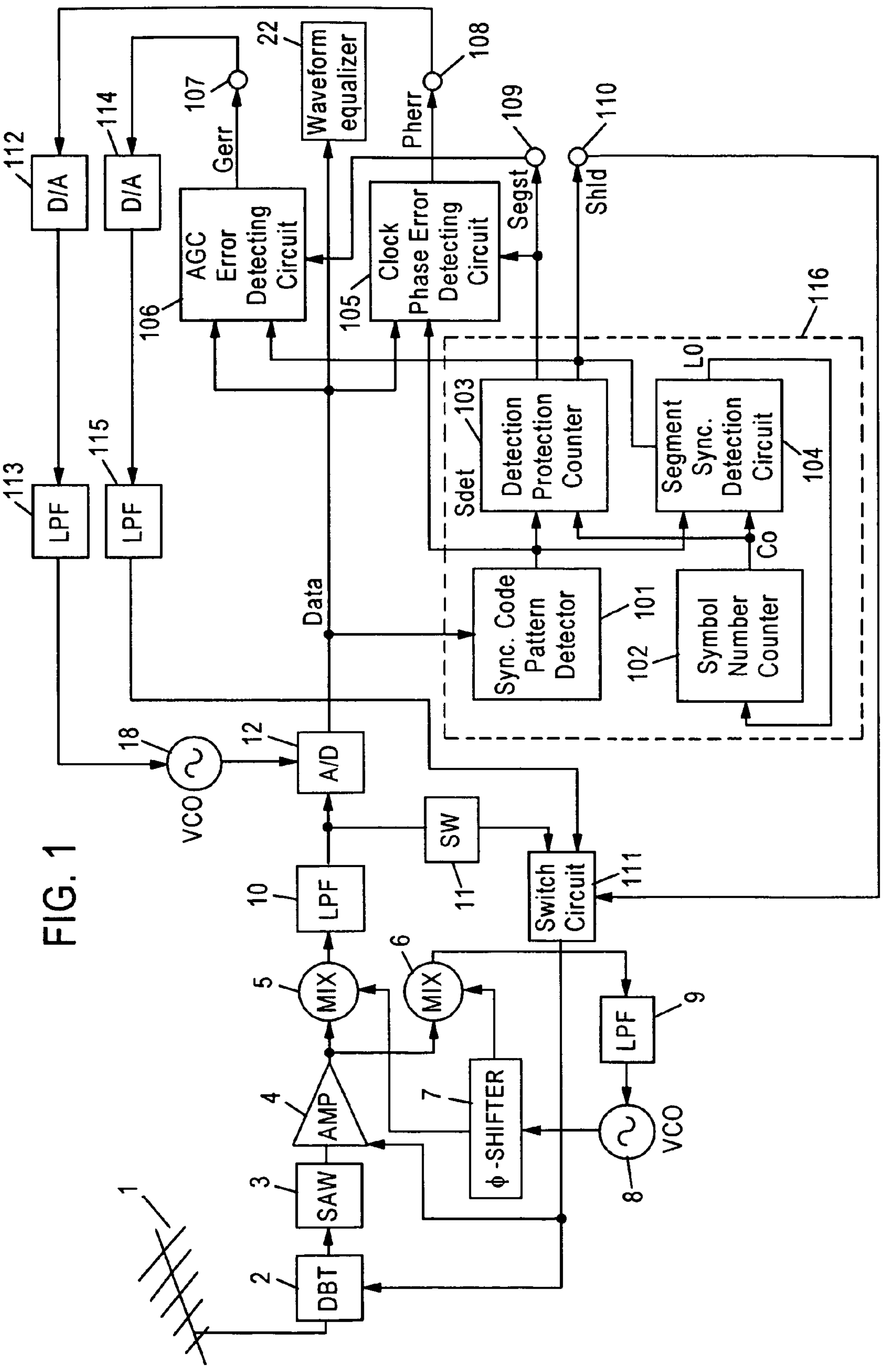
FIG. 1 is a general block diagram of a digital broadcast demodulator of the invention.
Figure 2:
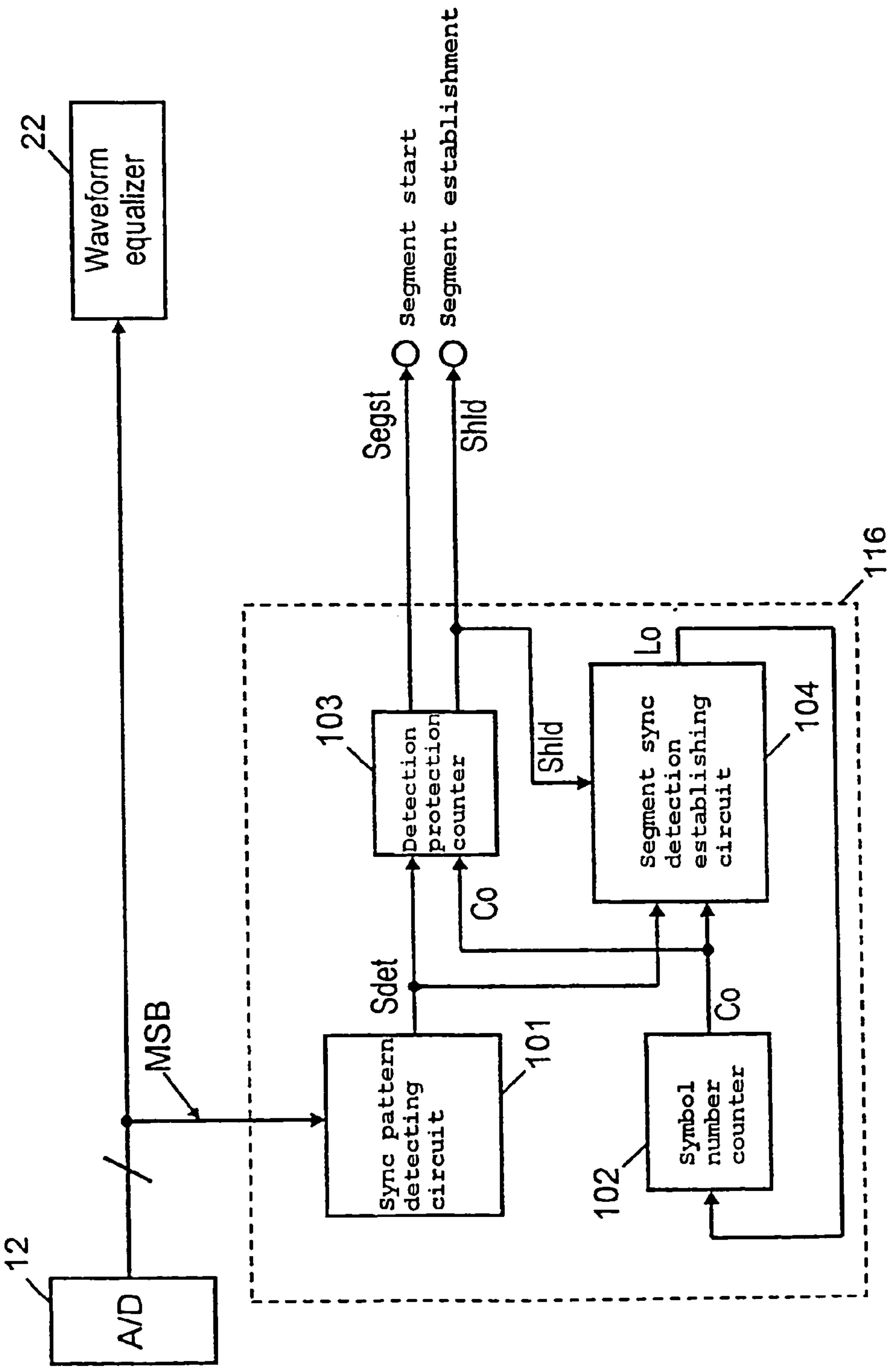
FIG. 2 is a block diagram of digital broadcast demodulator in embodiment 1 of the invention.
Figure 3:
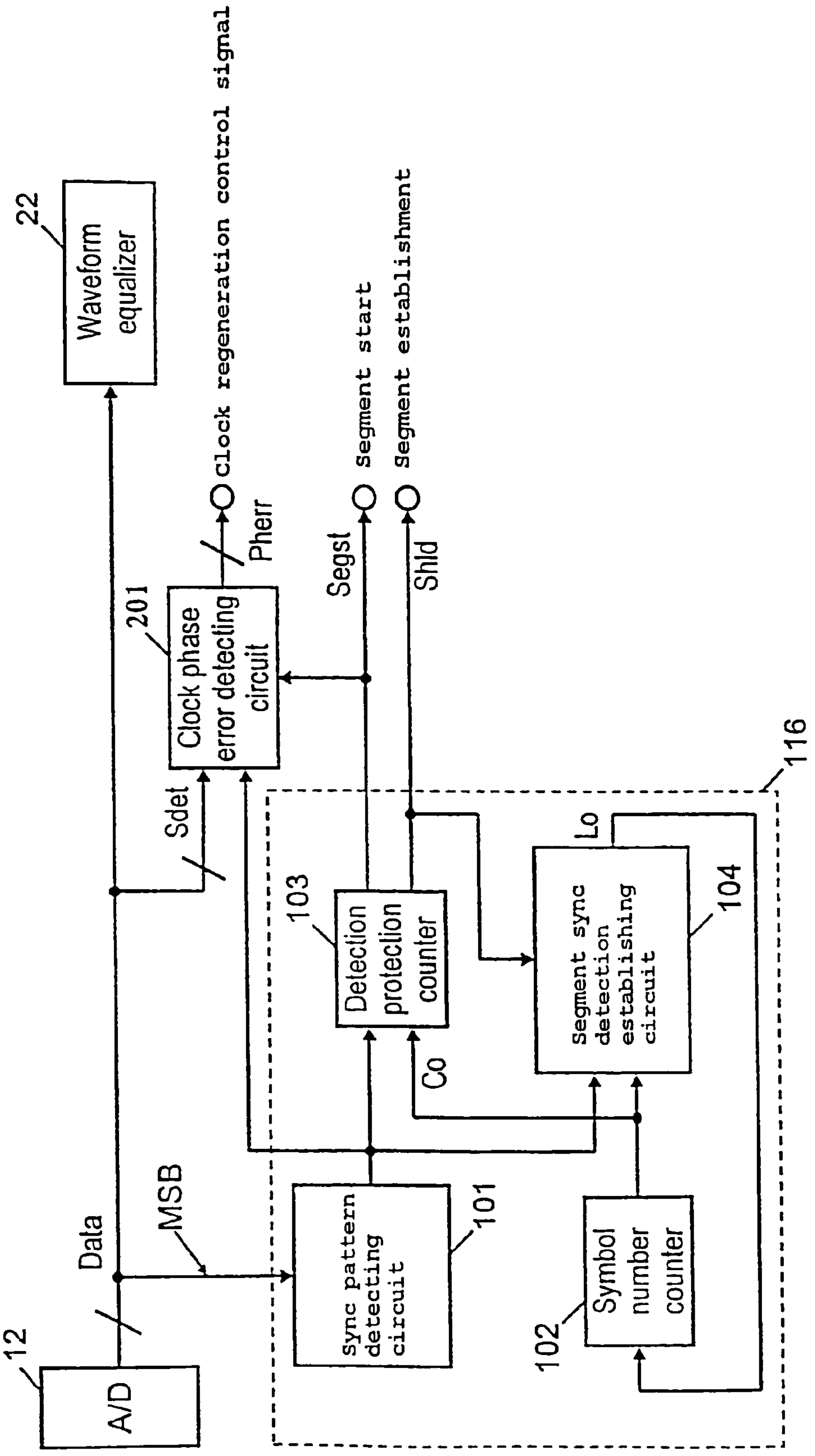
FIG. 3 is a block diagram of digital broadcast demodulator in embodiment 2 of the invention.
Figure 4:
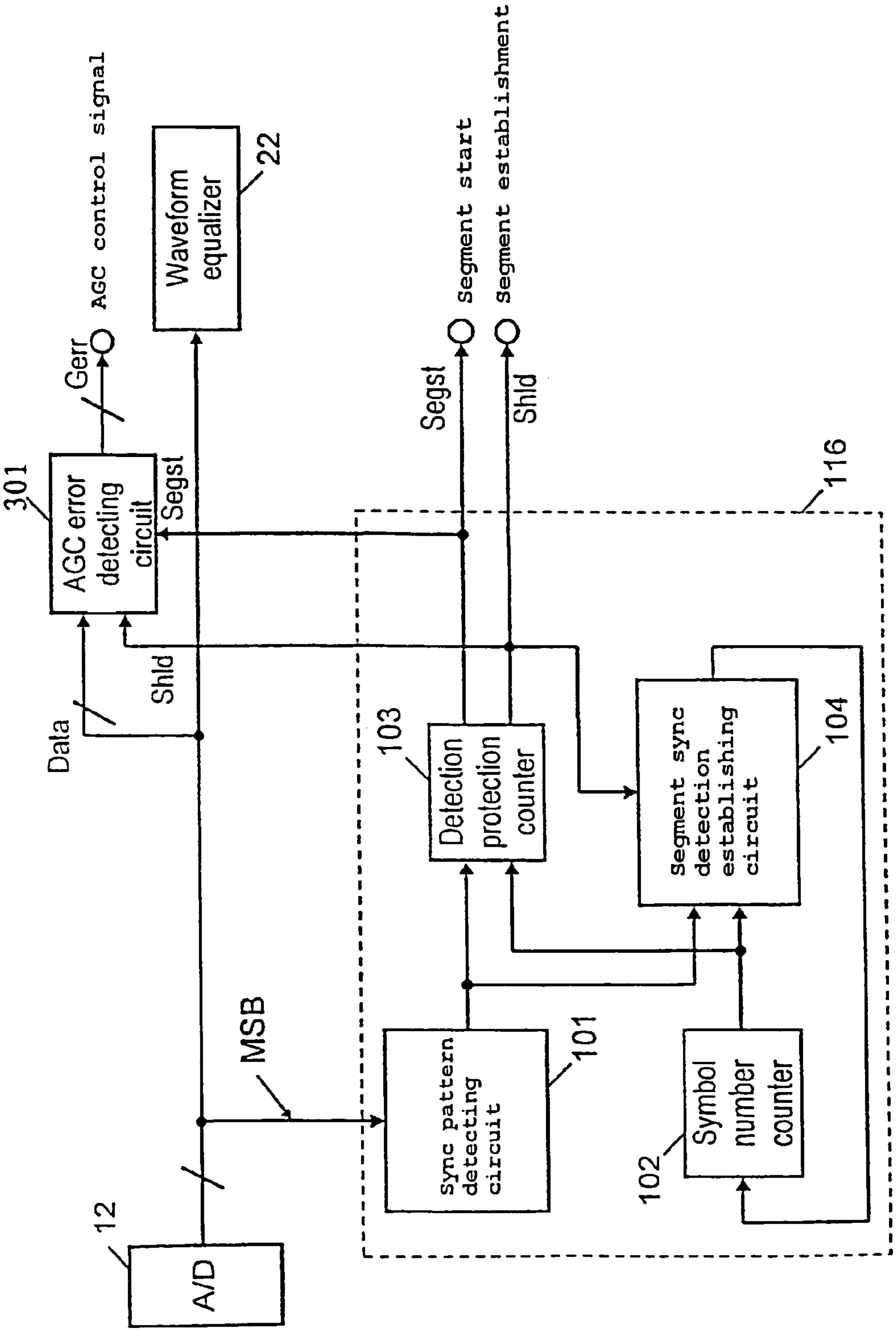
FIG. 4 is a block diagram of digital broadcast demodulator in embodiment 3 of the invention.
Figure 5:
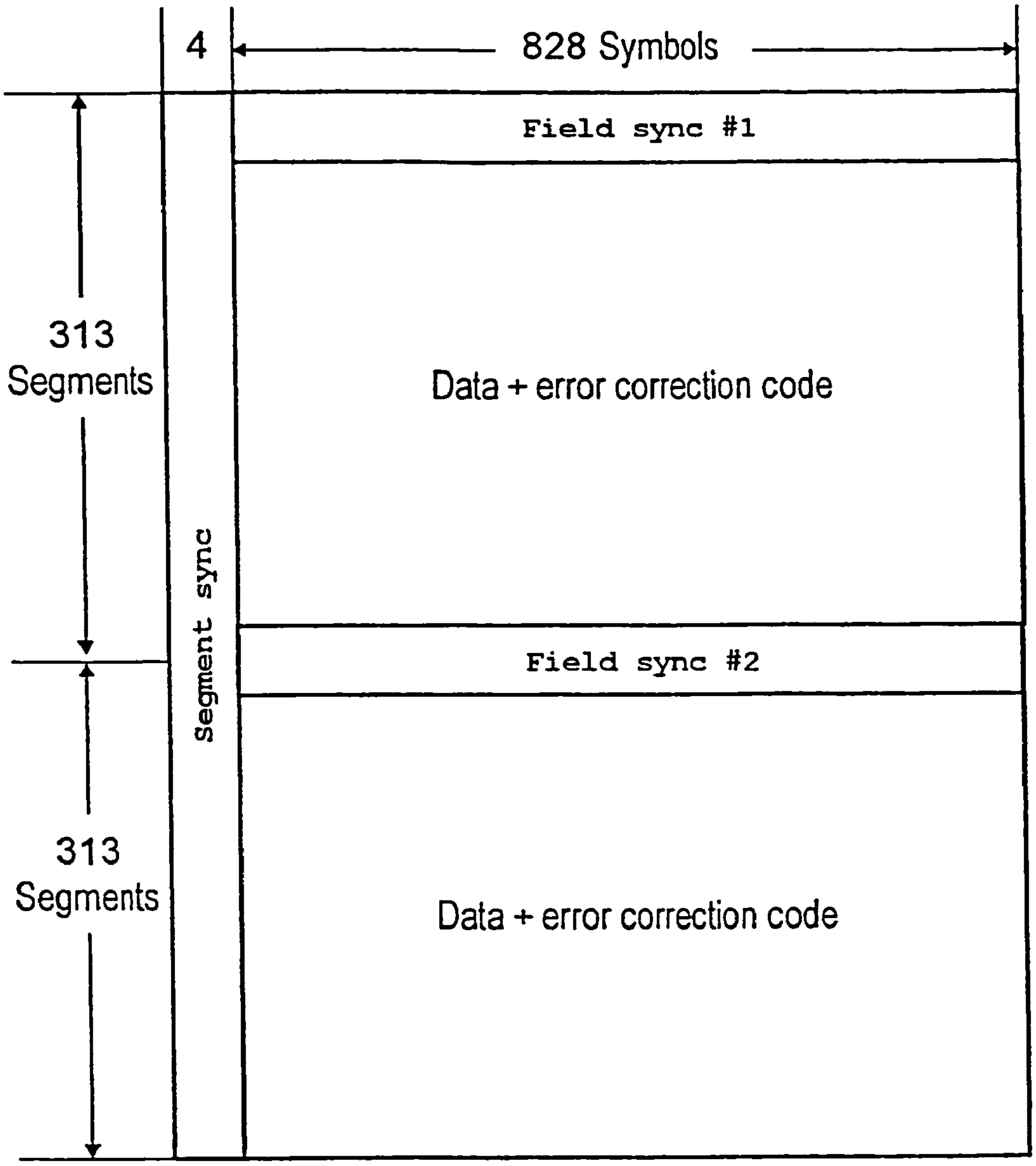
FIG. 5 is a data frame diagram of digital terrestrial broadcast VSB modulation system.
Figure 6:
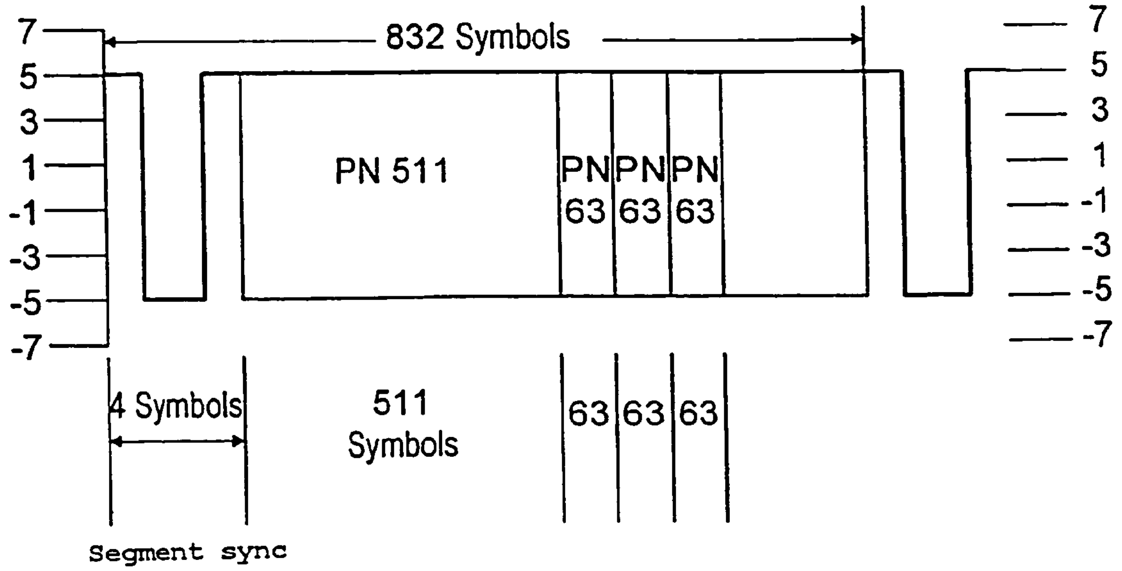
FIG. 6 is a field sync signal diagram of digital terrestrial broadcast VSB modulation system.
Figure 7:
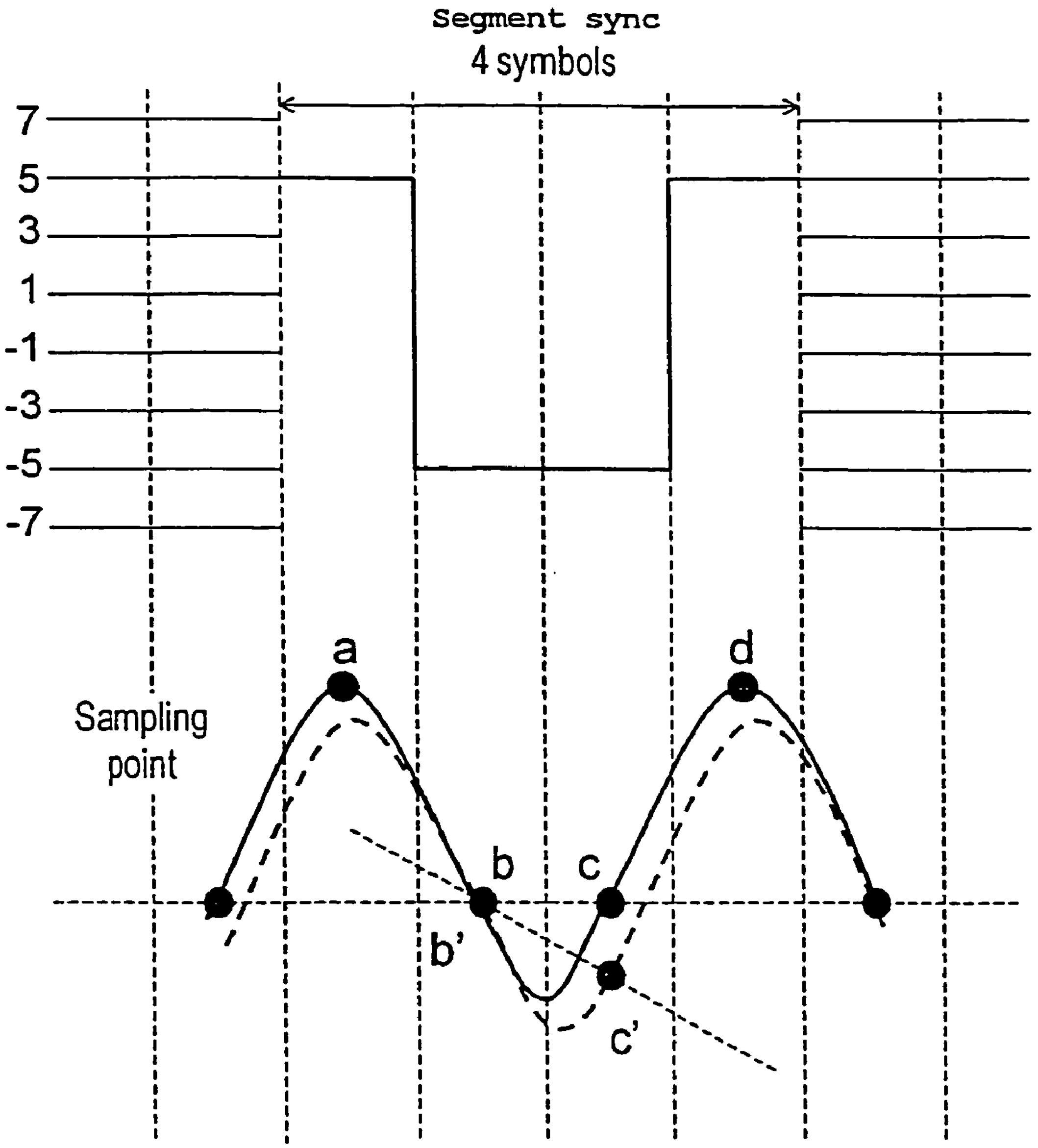
FIG. 7 is a sample waveform diagram of segment synchronous signal explaining embodiment 2 of the invention.
Figure 8:
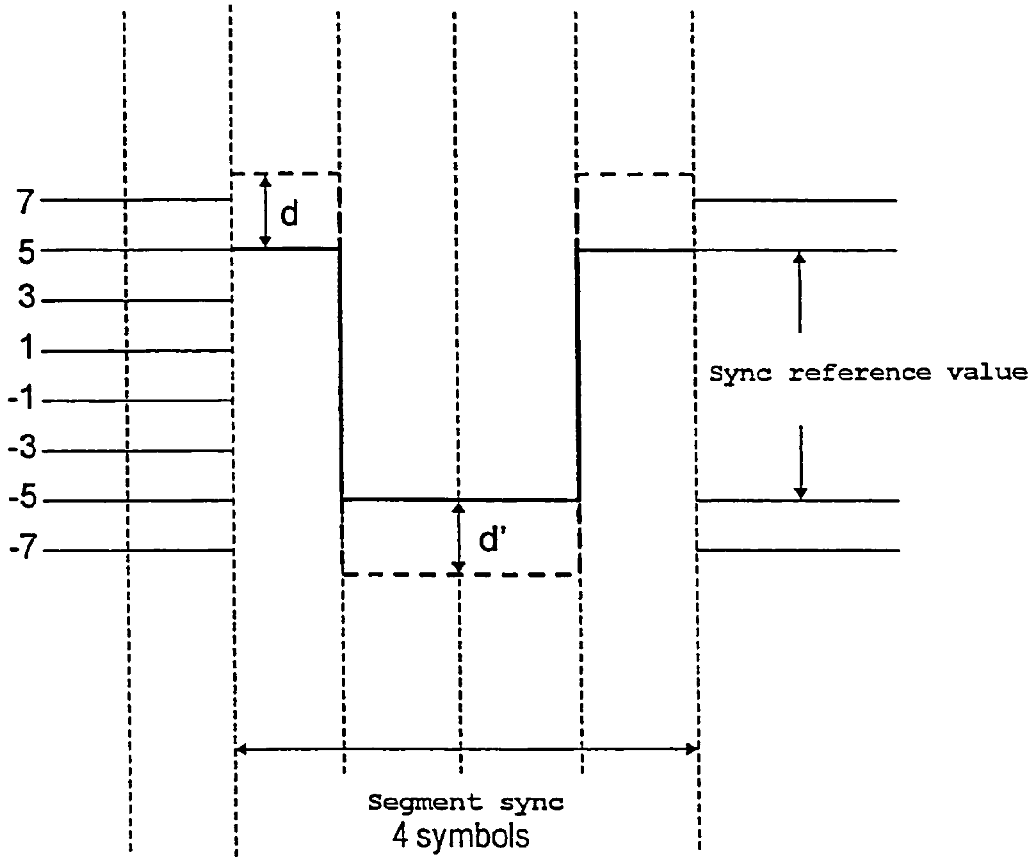
FIG. 8 is a waveform diagram of segment sync signal explaining embodiment 3 of the invention.
Figure 9:
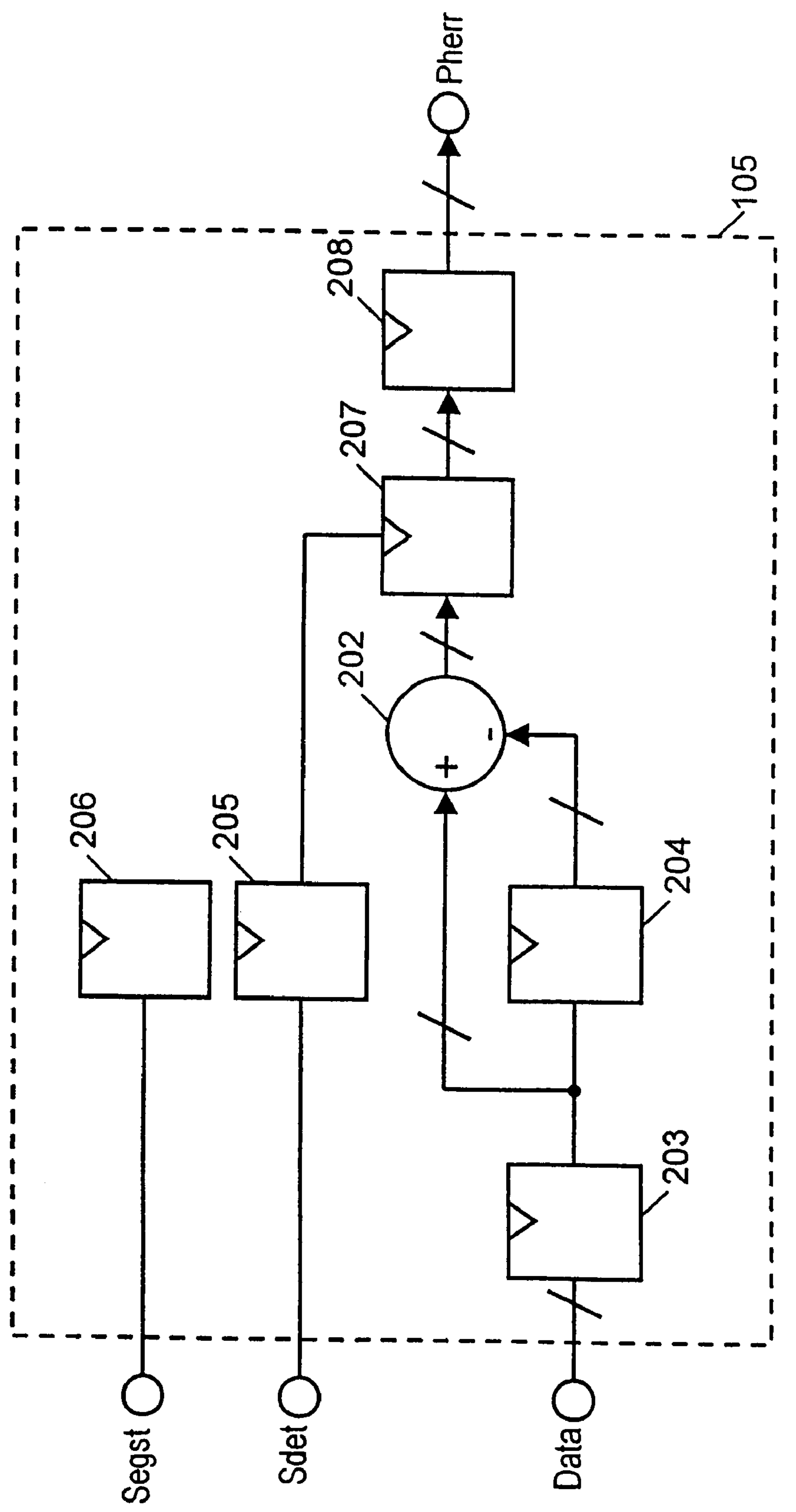
FIG. 9 is a block diagram of clock phase error detecting circuit of the invention.
Figure 10:
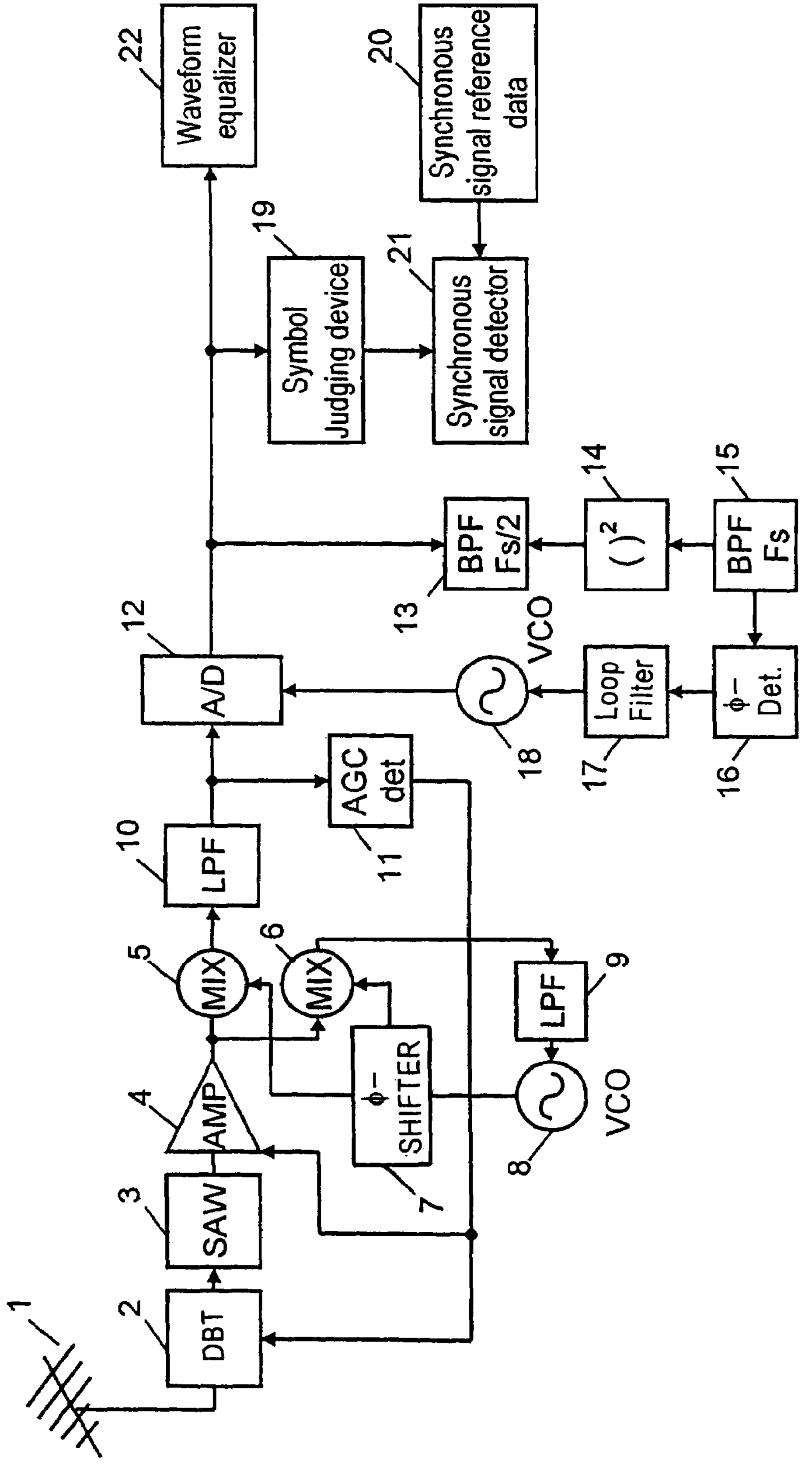
FIG. 10 (PRIOR ART)
FIG. 10 is a block diagram showing a constitution of a digital broadcast demodulator in a prior art.

1 Reception antenna
2 Digital broadcast tuner
3 SAW filter
4 Analog amplifier for amplifying signal
5, 6 Mixer
7 90-degree phase shifter
8, 18 VCO (voltage controlled oscillator)
9, 10 LPF (low pass filter)
11 AGC detector for detecting signal envelope
12 A/D converter
13 Band pass filter for passing frequency component of ½ of symbol speed
14 Square circuit
15 Band pass filter for passing frequency component of symbol speed Fs
16 Phase detector for detecting phase error
17 Loop filter
19 Symbol judging device
20 Synchronous signal reference data
21 Synchronous signal detector
22 Waveform equalizer
101 Sync pattern detecting circuit
102 Symbol number counter
103 Detection protection counter
104 Segment sync detection establishing circuit
105 Clock phase error detecting circuit
106 AGC error detecting circuit
107 AGC control signal terminal
108 Clock regeneration control signal terminal
109 Segment start signal (Segst) terminal
110 Segment establishing (Shld) terminal
112, 114 D/A converter
113, 115 LPF
116 Segment sync detection establishing block

What is claimed is:

1. A digital broadcast demodulator, being an apparatus for receiving digital broadcast by transmitting digital video and audio information coded by digital VSB modulation system in packet form, comprising:

a circuit for establishing a synchronous signal in reception data based on a polarity of the most significant bit (MSB) of the reception transport packet data, wherein the circuit for establishing the synchronous signal in reception data comprises:

a synchronous code pattern detecting circuit for detecting the segment synchronous code pattern from the most significant bit signal of the reception packet data, a symbol number counter circuit for counting the number of symbol data in the reception packet data, a synchronism detection establishing circuit for judging the true segment synchronous code pattern by obtaining the segment synchronous code pattern from said synchronous code pattern detecting circuit when said symbol number counter circuit finishes counting of a specified number, and a synchronism detection protection counter circuit for detecting and establishing the segment synchronous signal in the reception data from the output of said synchronous code pattern detecting circuit and count-up of specified number of said symbol number counter circuit.

2. A digital broadcast demodulator of claim 1, wherein the most significant bit signal of the reception packet data is processed so as to issue a signal showing the start position of the synchronous signal in the data and a signal of detecting and establishing the synchronous signal.

3. A digital broadcast demodulator of claim 1, being an apparatus for receiving digital broadcast by transmitting digital video and audio information coded by digital VSB modulation system in packet form, wherein a differential value of synchronous signals of reception packet data is determined so as to detect a clock phase error of transmission data, and a clock signal is regenerated by phase control on the basis of said clock phase error, said digital broadcast demodulator further comprising a clock phase error detecting circuit for issuing a clock phase error of transmission data by determining the difference of the N-th and N+1-th (N>1) synchronous signals which should be of same level by nature, from the code pattern detection signal of synchronous signal and signal showing position of synchronous signal.

4. A digital broadcast demodulator, being an apparatus for receiving digital broadcast by transmitting digital video and audio information coded by digital VSB modulation system in packet form, wherein a differential value of synchronous signals of reception packet data, which should be of the same level by nature, is determined so as to detect a clock phase error of transmission data, and a clock signal is regenerated by phase control on the basis of said clock phase error, said digital broadcast demodulator further comprising:

(a) a subtracting circuit for subtracting the N-th input from the N+1 th input of all reception data, (b) a circuit for outputting the subtraction input value obtained in step (a) only for the data coinciding with the code pattern of segment synchronous signal, and (c) a circuit for outputting said subtraction input value obtained in step (b) as a clock phase error signal only for the data positioned at the segment synchronous signal, wherein only the phase errors of a second symbol and a third symbol or a first symbol and a fourth symbol of said segment synchronous signal are outputted as said clock phase error.

5. A digital broadcast demodulator of claim 1, being an apparatus for receiving digital broadcast by transmitting digital video and audio information coded by digital VSB modulation system in packet form, wherein a synchronous signal in the received packet data is detected, the difference between the detected data value of the synchronous signal and a predetermined reference value is determined, and automatic gain control is performed on the basis of this difference, said digital broadcast demodulator further comprising an AGC error detecting circuit for detecting a specific position of synchronous signal from the signal showing detection and establishment of synchronous signal in the reception data and the signal showing position of synchronous signal, and issuing the error of the synchronous signal at this specific position and the reference value as a control signal.

6. A digital broadcast demodulator according to claim 1, wherein said polarity of the most significant bit (MSB) of the reception transport packet data is either positive or negative.

* * * * *